US006816622B2

(12) United States Patent
Blinn et al.

(10) Patent No.: US 6,816,622 B2
(45) Date of Patent: Nov. 9, 2004

(54) GENERATING RESIZED IMAGES USING RIPPLE FREE IMAGE FILTERING

(75) Inventors: James F. Blinn, Bellevue, WA (US); Andrew C. Godfrey, Redmond, WA (US); Michael D. Marr, Sammamish, WA (US); Adrian Secchia, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 586 days.

(21) Appl. No.: 09/982,435

(22) Filed: Oct. 18, 2001

(65) Prior Publication Data

US 2003/0077000 A1 Apr. 24, 2003

(51) Int. Cl.$^7$ .............................. G06K 9/40; G06K 9/64; G09G 5/00
(52) U.S. Cl. ........................ 382/260; 382/279; 345/611
(58) Field of Search ................................ 382/260, 266, 382/274, 275, 279, 298, 299, 300, 305; 345/611, 615, 660

(56) References Cited

U.S. PATENT DOCUMENTS

| 5,959,693 A | * | 9/1999 | Wu et al. ..................... 348/624 |
| 5,977,947 A | | 11/1999 | Potu |
| 6,052,130 A | | 4/2000 | Bardon et al. |
| 6,229,521 B1 | * | 5/2001 | Yip ............................. 345/611 |
| 6,310,601 B1 | | 10/2001 | Moore et al. |
| 6,400,849 B1 | * | 6/2002 | Lee et al. .................... 382/260 |
| 6,404,934 B1 | * | 6/2002 | Lee et al. .................... 382/260 |
| 6,414,682 B1 | | 7/2002 | Warren et al. |
| 6,445,832 B1 | * | 9/2002 | Lee et al. .................... 382/266 |
| 6,614,445 B1 | | 9/2003 | Dorbie |
| 6,748,120 B1 | * | 6/2004 | Bradley ....................... 382/299 |
| 6,760,486 B1 | * | 7/2004 | Chiao et al. ................. 382/274 |

* cited by examiner

Primary Examiner—Kanji Patel
(74) Attorney, Agent, or Firm—Leydig, Voit & Mayer, Ltd.

(57) ABSTRACT

An optimal filter kernel, formed by convolving a box filter with a filter of fixed integer width and unity area, is used to perform image resizing and reconstruction. The optimal filter has forced zeros at locations along a frequency scale corresponding to the reciprocal of the spacing of one or more pixels that comprise a source image to be resized. When a rescale value for a source image is selected, the optimal filter kernel is computed, mapped to the source image, and centered upon a location within the source image corresponding to the position of an output pixel to be generated. The number of pixels that lie underneath the optimal filter kernel is established by multiplying the number of pixels that comprise the width of the source image by the selected rescale value. Upon mapping the optimal filter kernel, the output pixel values that comprise the resized image are then evaluated by processing the one or more source image pixels, such as through interpolation. Alternatively, the output pixel values of the resized image are calculated by performing partial integral analysis with respect to a standard filter kernel of fixed width and unity area. The output pixel values are calculated by multiplying the pixel value for each pixel under the kernel by the area of the standard filter kernel surrounding the pixel. The products are then summed to reveal the output pixel value, and placed into the output image buffer. Both of these methods speed up the computation process, while producing a ripple free output image.

28 Claims, 11 Drawing Sheets

Case: m not integer multiple of n

Case: m not integer let alone multiple of n

Case: m is integer multiple of n, thus zeros occur @ each $\frac{1}{n}$ spacing for every $\frac{m}{n}$ th zero

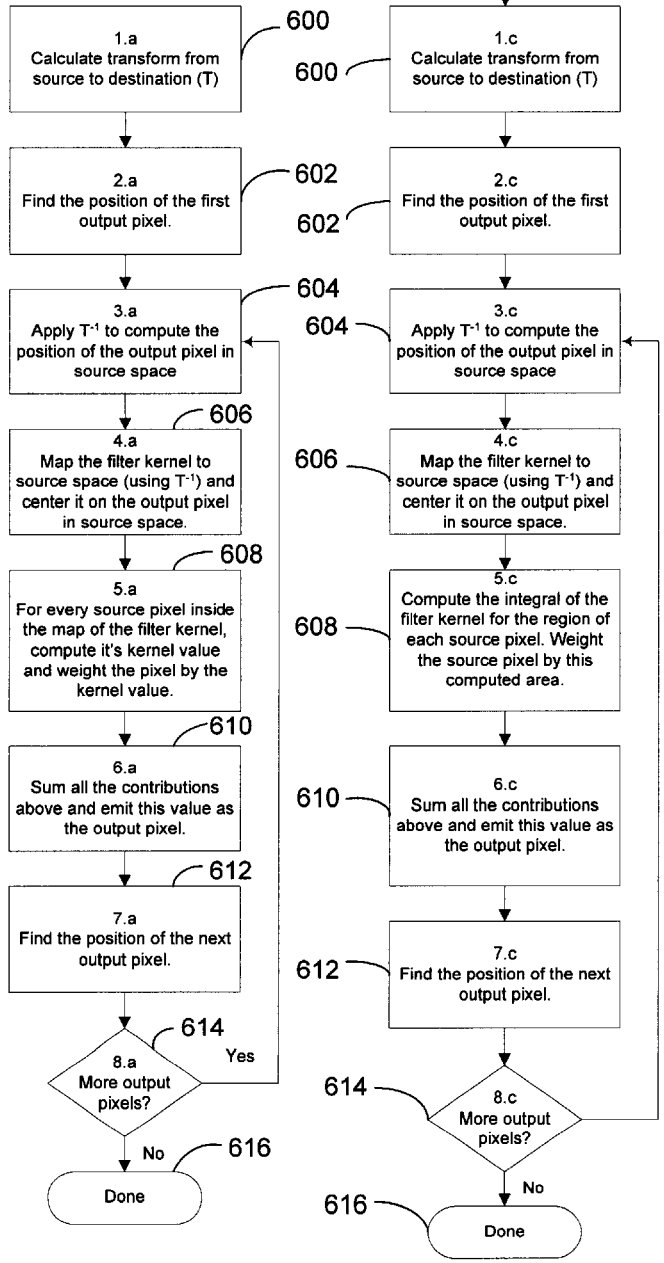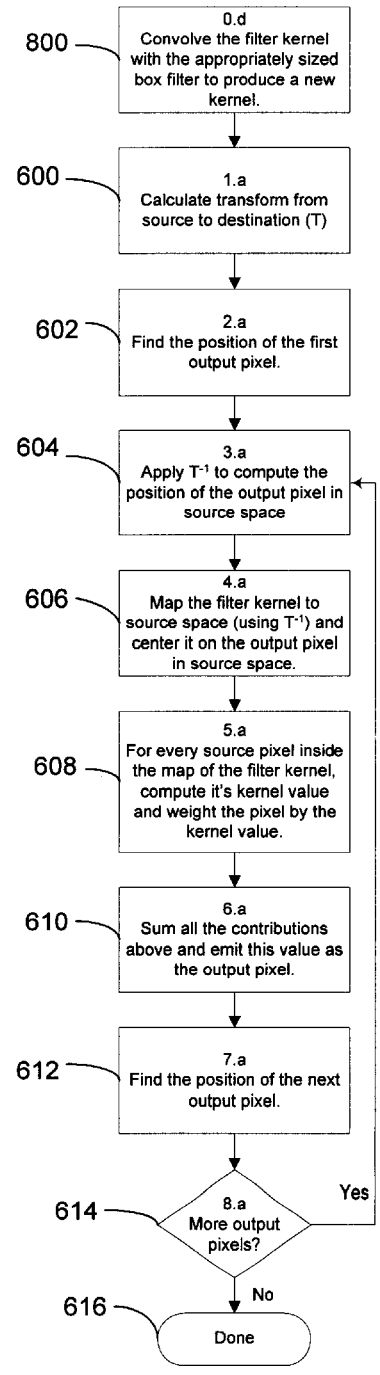

GENERATING RESIZED IMAGES USING RIPPLE FREE IMAGE FILTERING

TECHNICAL FIELD

This invention relates generally to image processing and, more particularly, relates to an image processing technique for eliminating ripples that occur within images that are resized.

BACKGROUND OF THE INVENTION

Image filtering and reconstruction are computational processes used commonly within computer software applications to affect how digital images, picture files and other graphic elements are rendered to a computer display device, such as a monitor. Typically, these image-processing techniques are used for resizing, repositioning and/or rotating an image, which in effect is a modification of the pixel data comprising the image. Pixels, short for picture elements, are the smallest addressable units that appear on a display screen. Multiple pixels, or samples, of varying color intensities are combined to represent a given image. The higher the pixel resolution (the more rows and columns of pixels), the more information can be displayed to the screen. Image filtering is a process by which a new image is generated as a result of processing the pixels of an existing image.

As an example of image filtering applied within software, consider the commonly used word processing application Microsoft Word. A useful feature of Word is that it allows a user to insert digitally sampled images, such as those scanned into the computer using a scanner, directly into a text document. This is particularly useful for creating newsletters, reports, and other published works that require high graphic content. Whenever the user wants to alter the natural size of an image embedded within the document (e.g. shrink it), they need only adjust it manually by toggling it with the mouse or by selecting the appropriate user commands. In resizing the image from its natural size or scale (100%) to a smaller size (x %; x<100), an image-filtering algorithm is applied to the source image pixel data to yield the appropriately resized output image. In computer graphics terms, shrinking an image is the process of representing the signal (waveform) representative of the source image with a similarly shaped output signal (waveform) of reduced size.

According to conventional techniques, a scaled down version of the original (sampled) image is generated using convolution filtering. Convolution filtering is an operation wherein the intensity value of a pixel to be placed into the output image is determined by summing up the intensity contributions of a group of pixels in the neighborhood of a source pixel. A neighborhood is defined as a range of pixels surrounding the source pixel. The number of pixels within the range is determined by the width of a filter kernel. Simply defined, the filter kernel is an array of values (weights) that characterize the type of filtering operation to be performed on the source image.

Filter kernels are not restricted to any particular size, and can be of varying shapes, including box shaped, tent shaped (bilinear) or an approximation to the sinc function (e.g., bi-cubic). Regardless of the shape, the filter kernel is typically symmetric about a two dimensional axis, and is designed so that the area, or response of the filter with respect to varying scale factors (x) is always unity. This is achieved by resizing the kernel width by the scale factor (x), while the height is resized to be the reciprocal of the scale factor (1/x). Unity response is maintained so that as the filter is applied to the source image, it is filtered as a constant value function, and not a periodic one. From a mathematical standpoint, this corresponds to filtering the waveform representative of the source image at a constant rate (constant number of pixels) to ensure the intensity contribution for each pixel is accounted for to represent the resized image. A non-unity filter kernel response can lead to pixel contributions that are not accounted for during the filtering process, thus creating unwanted visual effects in the output image.

In general, the filtering process begins by centering the filter kernel at a row/column position within the source image that corresponds to the location of the desired output pixel. Based on the width of the kernel, a number of pixels will lie beneath the kernel as it is centered accordingly. The resulting output pixel is calculated by multiplying the pixel values with the weight of the filter kernel at each respective row/column position of the pixels underneath the kernel. These values are then summed to reveal the total output pixel value, and placed into the output image. This process is repeated by shifting the filter, pixel by pixel, until each source pixel within the source image has been processed. The typical filtering process described above results in a desirable output image being generated. Because of the inverse relationship between the filter kernel width and height as set according to the selected rescale factor (x); a unity filter response is often maintained. As long as the number of pixels underneath the kernel remains constant throughout the filtering process—as the filter is shifted from pixel to pixel, the contribution for each pixel is accounted for in calculating the output pixel value. However, when a rescale factor (x) is selected that results in the filter kernel being resized to a non-integer width and height, unity area under the kernel is not maintained. This results in highly objectionable visual artifacts, such as ripples, being displayed in the output image. Ripples appear within digital images as longitudinal gaps of obscure color. They are visible within each of the color channels—red, blue, green and a (transparent)—that comprise a color image. Ripples occur whenever the filter kernel is set to a non-integer width as a result of resealing the image by the designated value x. For instance, if the rescale factor (x) is selected as 2.5, the filter width and height is adjusted from its default setting to 2.5 and 1/2.5 respectively. Because of this non-integer setting, the number of pixels that lie underneath the kernel as it is moved from pixel to pixel changes as opposed to remaining constant. This results in a cyclical pattern of increasing and decreasing filter kernel response that manifests as patterns of light and dark lines in the resized image. Clearly, this is not acceptable visual quality, particularly for those applications requiring rich graphic content.

Fortunately, there are some standard processes available for eliminating the ripple effect that occurs within images. For instance, one such method is to increase the size of the filter kernel such that significantly more pixels lie under the kernel as it is moved across the source image. This reduces the possibility of a non-constant filter response, and provides a more accurate approximation of the output pixel value. Also, there are other processes such as edge reduction and stochastic filtering, which also reduce unwanted visual peculiarities within digitally sampled images. However, these techniques are not always practical because they require a considerable amount of random-access memory (RAM) to operate on source image representations. This impedes the performance of software applications, such as word-processing or publishing software, that demand quick image processing capability. Moreover, the resource usage required to perform these techniques increases the software development and test process, negatively impacting the cost to the developer and consumer. To overcome these challenges, a way is needed to provide ripple free image rendering techniques that require only modest processing and memory resources.

SUMMARY OF THE INVENTION

The present invention is directed to a method and system for resizing an image to produce an output image that is free of ripples. Particularly, the invention eliminates the ripple effect that occurs within graphic images as a result of resizing, rescaling, or reconstruction without reliance upon high cost, impractical processing methods.

In accordance with the invention, an optimal filter kernel is formed by convolving a box filter with a filter of fixed integer width and unity area. The filter of fixed integer width and unity area can be any standard filter that is symmetric about an axis, including bilinear or bicubic. The resultant optimal filter has forced zeros at locations along a frequency scale corresponding to the reciprocal of the spacing of one or more pixels that comprise a source image to be resized. In the spatial domain, this corresponds to a filter having characteristics such that a constant filter response is maintained as the filter is moved from pixel to pixel within the source image. Upon the selection of a rescale value for the source image, the optimal filter kernel is computed and then mapped to the source image. Specifically, the filter is mapped and centered upon a location within the source image corresponding to the position of an output pixel to be generated. The number of pixels that lie underneath the optimal filter is established by multiplying the number of pixels that comprise the width of the source image by the selected rescale value. Upon mapping the optimal filter, the output pixel values that comprise the resized image are then evaluated by processing the one or more pixels that comprise the source image, such as through interpolation. These values are then placed into a memory/buffer allocated for the output image, resulting in an output image generated free of ripples.

In another aspect of the invention, partial integral analysis is applied with respect to a standard filter kernel of fixed integer width and unity area (e.g., bilinear or bicubic). The number of pixels that lie underneath the filter once it is mapped to the source image is established by multiplying the number of pixels that comprise the width of the source image by the selected rescale value. Upon mapping the filter, the output pixel values of the resized image are calculated by multiplying the pixel value for each pixel under the kernel by the area of the filter kernel surrounding the pixel. The products are then summed to reveal the output pixel value, and placed into the output image buffer. This operation is performed repeatedly on each pixel of the source image until the resized output image is fully generated. Because the computation of the output pixel is performed using partial integral analysis, a lookup table containing the total area of the filter kernel (instead of actual kernel values for specific points) can be implemented. This speeds up the computation process, while still producing a ripple free output image.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 11 is a flowchart illustrating the various methods of performing image rescaling.

DETAILED DESCRIPTION OF THE INVENTION

Figure 1:
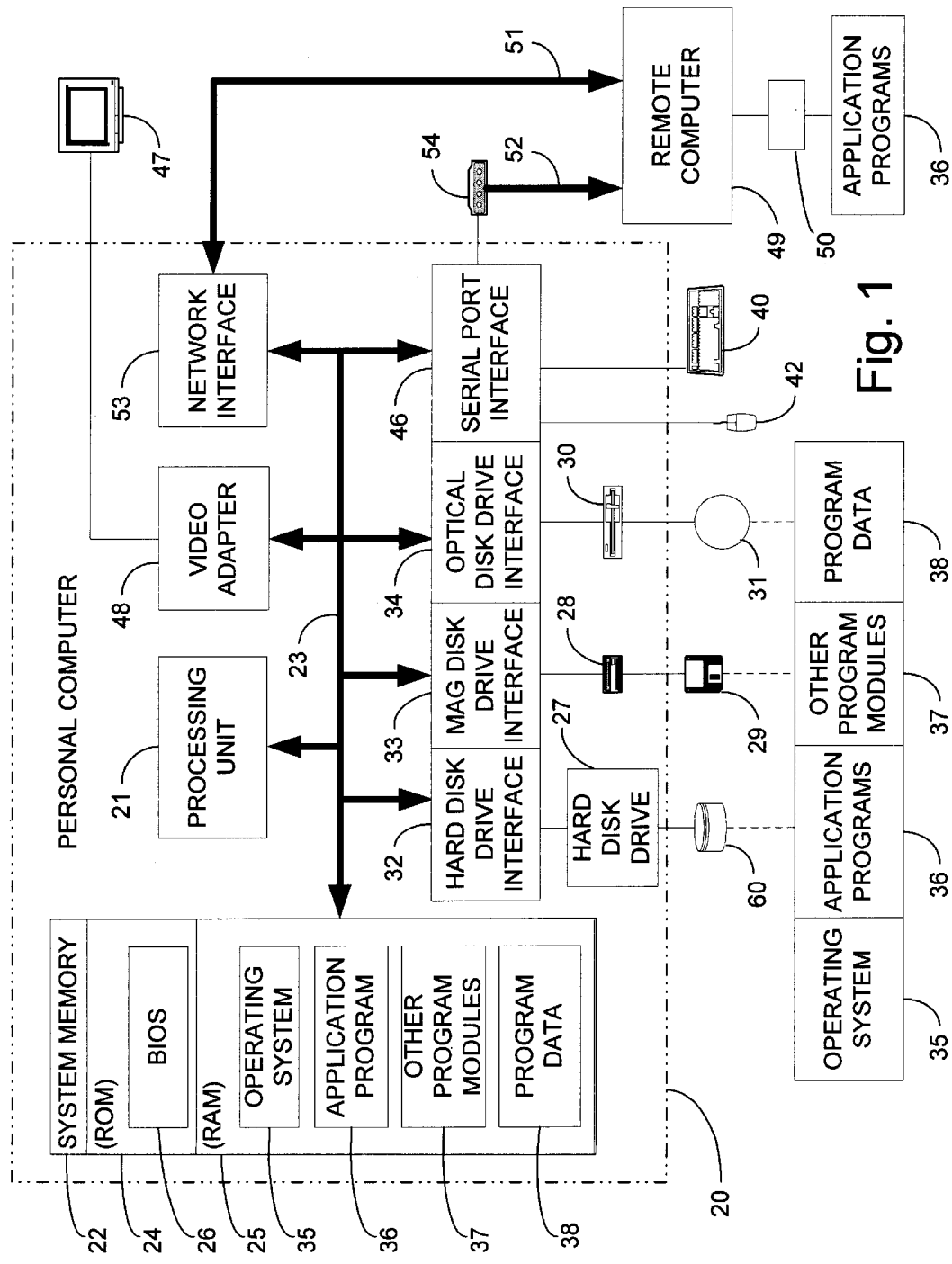
FIG. 1 is a block diagram generally illustrating an exemplary computer system on which the present invention resides.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. Such data may include images, sounds, data structures and any other information capable of being represented by electrical signals. The processing unit transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. While the invention is being described in the foregoing context, it is not meant to be limiting as those of skill in the art will appreciate that various of the acts and operations described hereinafter may also be implemented in hardware.

Also, the following description will describe acts and procedures to be carried out for performing image processing. As set forth herein, image processing refers to any operation in which an image is to be operated upon via computer-executable methods such that the data representative of the image is modified or applied to suit a specific need. This can include resizing, rescaling, rotating, reconstruction, up/down sampling, magnification or minification of any image represented in digital form. These acts are often performed in software applications that offer graphic handling capabilities and that employ a graphical user interface. The generic term "resizing" or "rescaling" will be used throughout the description to refer to any of the above described acts of image processing.

Also as used herein, the term "sampling" refers to the process of representing an image, comprised of several bits of information, as a set of distinct samples collected at a specific rate (frequency). Each sample, which in the context of images relates to a pixel, contains information that is descriptive of an object being represented in image form. In general, an object (e.g. a picture or physical article) is any data can be sampled using various image-capturing methods, such as with a digital camera, scanner or other such device. Furthermore, a sampled image refers to any object that is represented with a plurality of samples at a specific rate, known as the sample rate. While sampling is not limited to the field of image processing alone, it is used in the context of the present invention with relation to any images capable of being rendered to a computer display device.

Still further, the invention will be described with reference to various mathematical or computational operations that are performed on images. In particular, the images described herein will be presented in the context of the spatial domain, or the frequency domain. The spatial domain with respect to images refers to representations of objects with respect to time while the frequency domain refers to object representations with respect to frequency. Mathematically, a signal represented in the spatial domain can be converted to its corresponding frequency domain equivalent via Fourier transform analysis. Conversely, a signal in the frequency domain can be transformed to its spatial domain equivalent using the inverse Fourier transform. Because images are comprised of samples of varying intensity levels, the intensity signals representative of the image can be described in either domain. In an effort to thoroughly illustrate the various aspects of the invention, reference will be made to the domain in which the image is being referred to whenever feasible. However, those skilled in the art will appreciate that digital images when discussed in terms of pixels can refer to either the spatial or frequency domain.

Turning now to the drawings, wherein like reference numerals refer to like elements, the invention is described with reference to a general computing environment. Although not required for practicing the invention, the invention is described as it is implemented by computer-executable instructions, such as program modules, that are executed by a PC (PC). Generally, program modules include routines, programs, objects, components, data structures and the like that perform particular tasks or implement particular abstract data types.

The invention may be implemented in computer system configurations other than a PC. For example, the invention may be realized in hand-held devices, multi-processor systems, microprocessor-based or programmable consumer electronics, network PCs, minicomputers, mainframe computers and the like. The invention may also be practiced in distributed computing environments, where tasks are performed by remote processing devices that are linked through a communications network. In a distributed computing environment, program modules may be located in both local and remote memory storage devices.

While the invention may be incorporated into many types of computing environments, the following detailed description of the invention is set forth in the context of an exemplary general-purpose computing device in the form of a conventional PC 20, shown in FIG. 1.

The PC 20 includes a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic source/output system (BIOS) 26, containing the basic routines that help to transfer information between elements within the PC 20, such as during start-up, is stored in ROM 24. The PC 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the PC 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the PC 20 through source devices such as a keyboard 40 and a pointing device 42. Other source devices (not shown) may include a microphone, joystick, game pad, satellite dish, scanner, or the like. These and other source devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, PCs typically include other peripheral output devices, not shown, such as speakers and printers.

The PC 20 may operate in a networked environment using logical connections to one or more remote computers, such as a remote computer 49. The remote computer 49 may be another PC, a server, a router, a network PC, a peer device or other common network node, and typically includes many or all of the elements described above relative to the PC 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the PC 20 is connected to the local network 51 through a network interface or adapter 53. When used in a WAN networking environment, the PC 20 typically includes a modem 54 or other means for establishing communications over the WAN 52. The modem 54, which may be internal or external, is connected to the system bus 23 via the serial port interface 46. In a networked environment, program modules depicted relative to the PC 20, or portions thereof, may be stored in the remote memory storage device. It will be appreciated that the network connections shown are exemplary and other means of establishing a communications link between the computers may be used.

The present invention relates to a method and system for resizing images such that the unsightly effect of ripples does not occur in the generated output image. This feature is particularly useful in software applications capable of rendering images to a computer display, and may also be practiced in any other computer executable applications. This includes operating system screens, graphical user interfaces, desktop displays, etc. Any operation or application wherein the resizing of an image is required or useful can employ the features provided by the invention.

Figure 2:
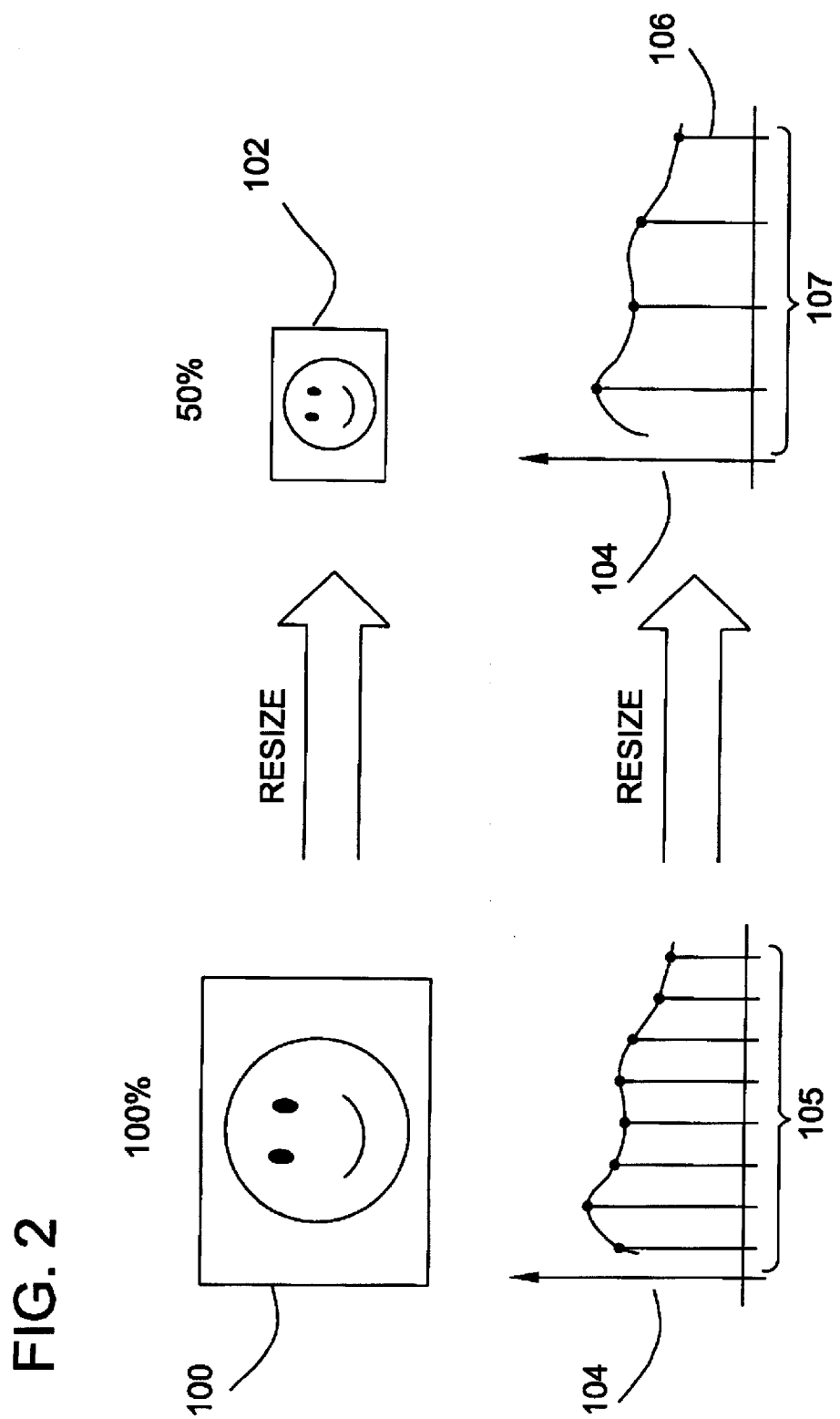
FIG. 2 is a diagram illustrating a digital image before and after rescaling.

Referring now to FIG. 2, a sampled image 100 and its corresponding resized representation 102 are shown. The sampled image 100 is given at its original scale factor 100%, which represents the scale of the image as stored in memory 25 of the computer 20 upon capture. Images are rendered to a display screen 47 as a plurality of pixels, or samples, of different color intensities. Pixels, short for picture elements, are the smallest addressable units that appear on a display screen. In the simplest case of binary images, the pixel value is a 1-bit number indicating either foreground or background. For grayscale images, the pixel value is a single number that represents the brightness of the pixel. The most common pixel format is the byte image, where the number is stored as an 8-bit integer giving a range of possible values from 0 to 255. Typically zero is taken to be black, and 255 is taken to be white. Values in between make up the different shades of gray. To represent color images, separate red, green and blue components must be specified for each pixel, and so the pixel 'value' is actually a vector of three numbers. Often the three different components are stored as three separate 'grayscale' images known as color planes (one for each of red, green and blue), which have to be recombined when displaying or processing.

As shown in the figure, image 100 is resized to a scale of half its original value (50%) to produce image 102. Image resizing is a typical operation within graphics capable software packages, and is carried out by the application itself, or manually by a user of the application. An application user wishing to resize a sampled image need only minimize the sides of the image using a mouse 42 or similar pointing device, or invoke the proper user commands using the keyboard 40. This effectively reduces the number of pixels used to represent the image. Likewise, the process of resizing is equivalent to modifying the waveform representative of the sampled image 104 using a varied number of sample points. In this case, the image 100 is represented by a waveform 104 comprised of eight sample points 105. Each sample point corresponds to a color intensity value of the image for a specific capture rate, or frequency. According to the figure, the original image 100 is rescaled to create image 102 such that the representative waveform 106 contains only half the number of sample points 107, or four. Nonetheless, while the scaled down image 106 has only half the number of sample points, the relative shape of the waveform is maintained. This phenomenon represents the ideal case of downsampling or image shrinking; a process in which the same exact image (waveform) is depicted using less information (samples).

The steps involved in performing a typical rescale operation are illustrated in FIGS. 3a through 3d. Once a rescale factor x is selected to be applied to an image 124 by the user or application, the transform (T) used to create the digital representation 124 of the source object 120 is determined. The transform (T) is an algorithm or function based on the decomposition of signals into sinusoids. In the illustrated embodiment, the signals can be light intensity patterns detected by an image-capturing device 122 applied to the source object 120. The image-capturing device can be a digital camera, scanner or any other device capable of interpreting color or light intensity signals. Upon capture, the source object 120 is represented digitally 124 by a plurality of pixels. The number of pixels that comprise the image is based in part on the sampling rate of the image-capturing device 122.

After the transform is determined, the position of the first output pixel 134 as it would lie upon rescale is determined. Operatively, this equates to calculating the shift $\epsilon$ that occurs as a result of rescaling the destination image by x. This operation is illustrated by way of example in FIG. 3b. A row consisting of six pixels 126 are shown as a subset of pixels from the sampled image 124. Each pixel (represented graphically as a box) contains a corresponding color intensity value. In resizing from six pixels 126 to say, four pixels 128, the same image information provided by the six pixels 126 must be maintained. This corresponds to representing the waveform descriptive of the image 130 with fewer samples, as shown in 132. As a result of rescaling, the spacing between the samples of the original waveform 130 are shifted by $\epsilon$ in waveform 132. This is the same as evenly distributing the four sample points of the waveform 132 to cover enough info as the six sample points of waveform 130.

As the next step in the rescaling process, a filter kernel is mapped to the sampled image 124 by applying the inverse of the calculated transform ($T^1$) to the sampled image 124. A filter kernel is an array of values that define the characteristics of the filter to be used for processing the pixels of the sampled image 124. Various types of filter kernels can be applied for performing this operation, and will be discussed in a later section of the description. Mathematically, the process of mapping the filter kernel to the sampled image corresponds to multiplying the kernel with the waveform descriptive of the image 130 (with respect to the spatial domain) such that it is centered at the location of the output pixel to be generated 134. As shown in 3c, this results in placing the filter 136 over the row of pixels 126 such that one or more samples 138 lie under the kernel as it is centered.

Figure 3A:
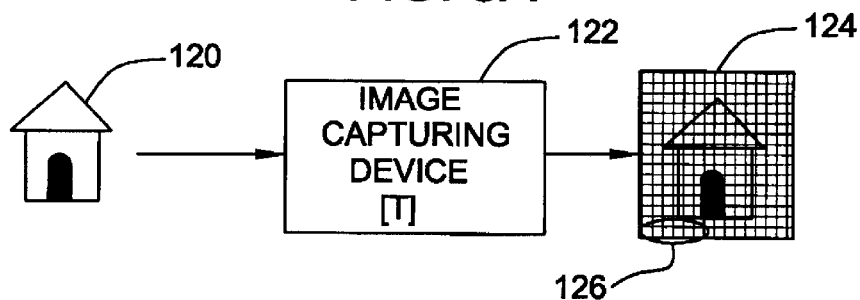
FIG. 3 is a diagram generally illustrating a conventional technique for performing image rescaling.
Figure 3B:
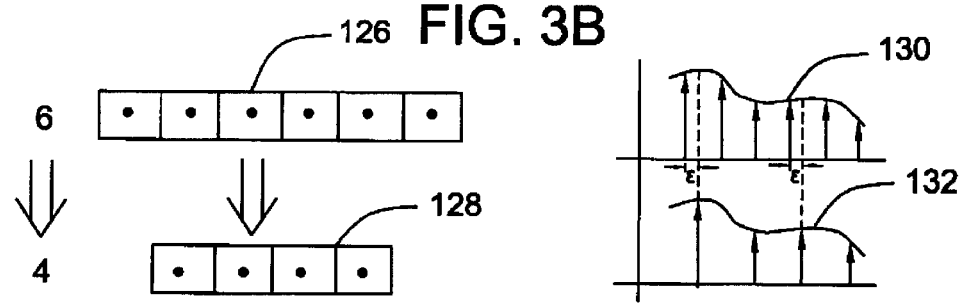
Figure 3C:
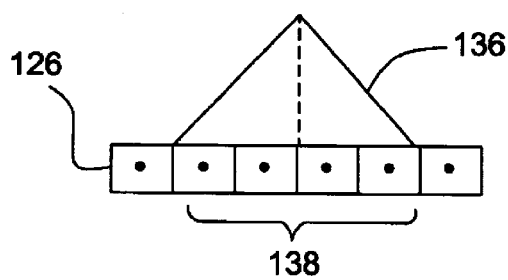
Figure 3D:
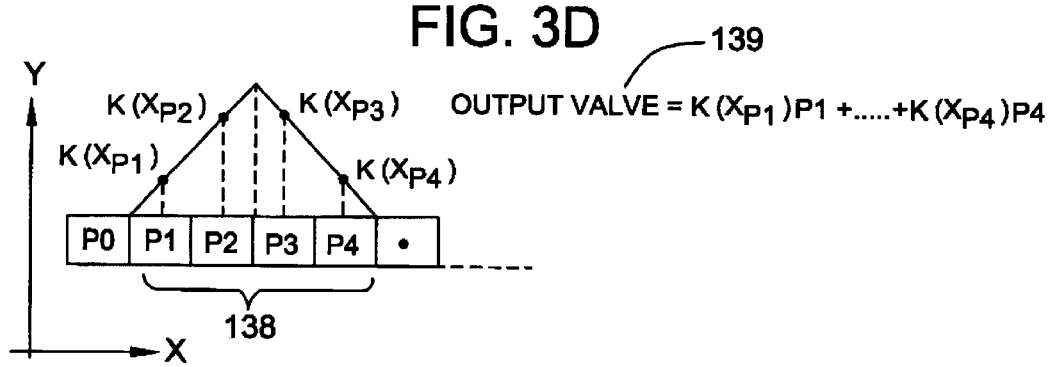

FIG. 3d illustrates the process of pixel interpolation, the final step of the rescaling process. Interpolation is the process of determining a final value based on the information provided by one or more data points contained within a specified region. In the case of pixel interpolation, the output pixel value to be located at position 134 is calculated using the information provided by the one or more pixels that lie underneath filter kernel 136. As such, the width (extent) of the filter kernel 136 determines the range of pixels to be used for performing the calculation. The interpolation procedure is performed by multiplying the intensity values of the pixels that lie underneath the kernel with the weight, or height, of the kernel at each respective position of the pixels. For example, in FIG. 3d, the filter kernel 136 is centered such that four pixels 138—each containing color intensity information P1 thru P4—lie underneath the kernel. The output pixel value 139 is calculated by multiplying the pixel values P1 thru P4 with the weight of the filter kernel $K(x_{P1})$ thru $K(x_{P2})$, where x is the respective position of the pixels underneath the kernel. These values are then summed to reveal the total output pixel value 139, and placed into a memory location allocated for the output image. This process is repeated by shifting the filter, pixel by pixel, until each source pixel within the source image 124 has been processed.

The procedure described above refers to the conventional means of rescaling, and is commonly used within applications that are graphic intensive, or that require quick image processing capabilities. In performing this technique, various filter kernels can be applied to the source image to render the appropriate output image. The most common types of filter kernels—box, bilinear and bicubic—are illustrated in greater detail with respect to the spatial domain (x-y scale) in FIG. 4.

Figure 4A:
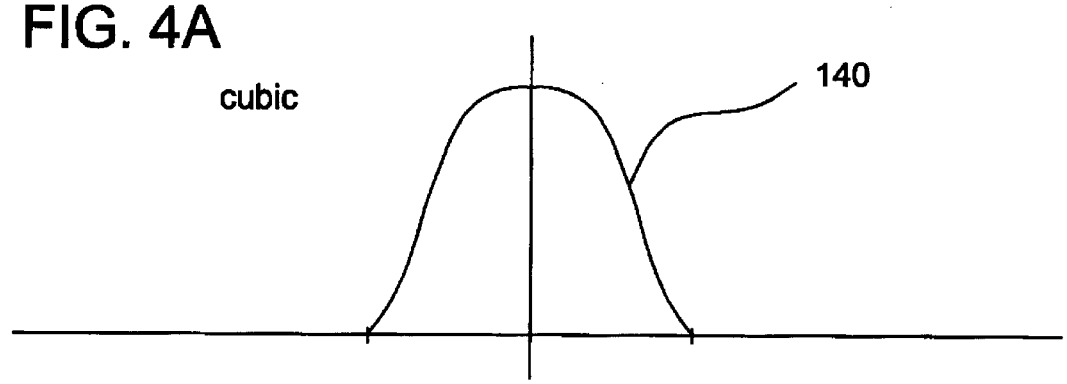
FIG. 4 is a diagram illustrating the various types of filters that are typically applied to perform image filtering.
Figure 4B:
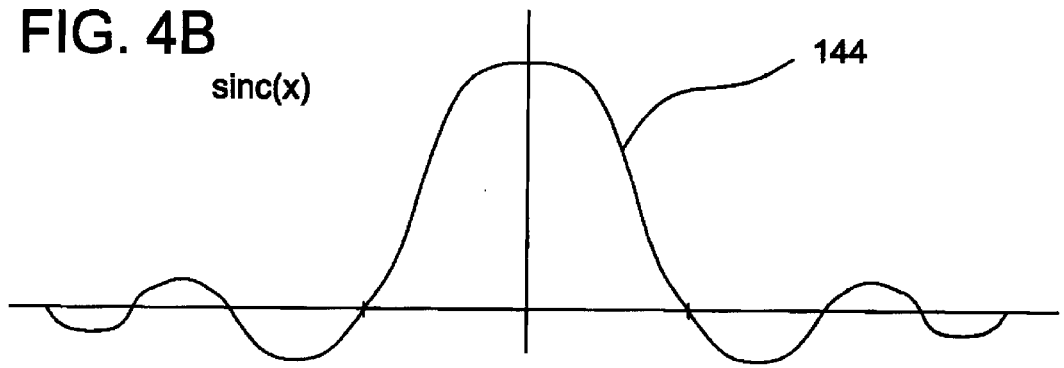

In FIG. 4*a*, a bicubic filter 140 is shown. The bicubic filter 140 is a piecewise approximation to an ideal filter known as the sinc filter 144, shown in FIG. 4*b*. In imaging applications, the sinc filter 144 is known to be ideal because it is given by the mathematical function sinc(x). Hence, it extends infinitely along an axis to provide a filter of infinite extent. As such, the sinc filter 144 can yield a highly accurate calculation of the output pixel value during the interpolation process, as more pixels would be considered during the computation. However, the time and resources (CPU, memory, etc.) required to perform image processing using a filter of infinite extent makes the use of this filter highly impractical. For this reason, the bicubic filter 140 is more conducive for usage within image processing applications.

Figure 4C:
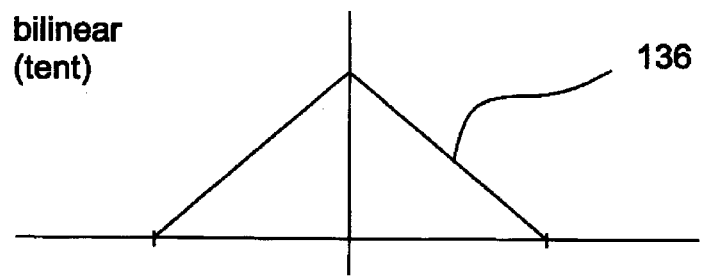
Figure 4D:
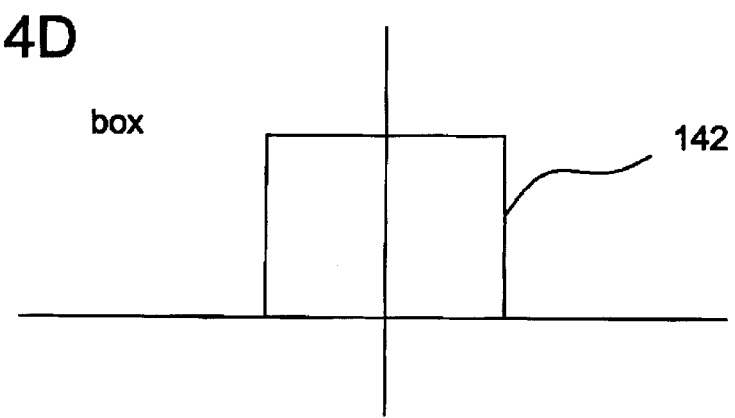

In FIG. 4*c*, another commonly used filter within imaging applications known as a bilinear 136 or tent filter, is illustrated. The bilinear is shown in FIG. 3*c* and 3*d* as being applied to the waveform 130 representative of the sampled image 124. Bilinear filters 136 are a suitable alternative to the bicubic filter 140, and are based on a linear approximation. Like the bicubic 140, the bilinear filter 136 provides zeros at all points outside of its width. Similarly, the box filter 142 of FIG. 4*d* also zeros out any content outside of its width. When properly constructed and applied to an image to be processed, these filters provide suitable anti-aliasing properties. In digital imaging, "anti-aliasing" is the process of minimizing visual defects, such as Moiré patterns, jagged or course details, and other unwanted visual effects. Moreover, these filters are of limited extent, and thus are more practical and cost effective than the sinc filter 144.

Regardless of the type of filter used to perform the rescaling process, the desirable property of the filter applied to an image is that it generates a constant output (response) given a constant input. In other words, if the filter is fed a series of identical pixels it will output that same series of identical pixels. To achieve this, conventional filter kernels are designed so that unity area is maintained with varying rescale values. Unity area refers to the area underneath the kernel as it is applied to the pixels that comprise the image. This area is established according to the height and width of the kernel. Evaluating the height of the kernel at each pixel positioned underneath the kernel and then summing these values up determines the filter response. As long as this response is unity, the output image generated will remain clear of visual defects. However, when a constant response is not maintained (e.g. non-unity filter response), visual defects such as ripples occur within the output image. The dynamics behind this phenomenon is explained in greater detail in later paragraphs of the description. In the following paragraphs, the 'ideal' properties of a filter for maintaining constant filter response, and consequently ripple free output will be discussed.

Ideal Filter Properties

Figure 5A:
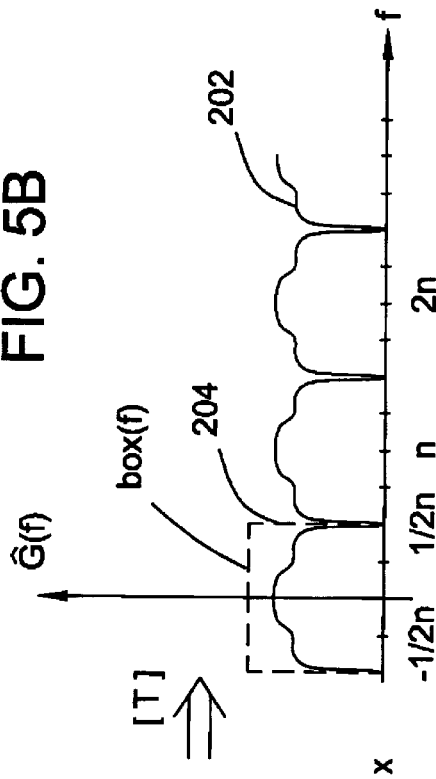
FIG. 5 is a diagram illustrating the characteristics of an ideal filter as applied to a sampled image to be scaled.
Figure 5B:
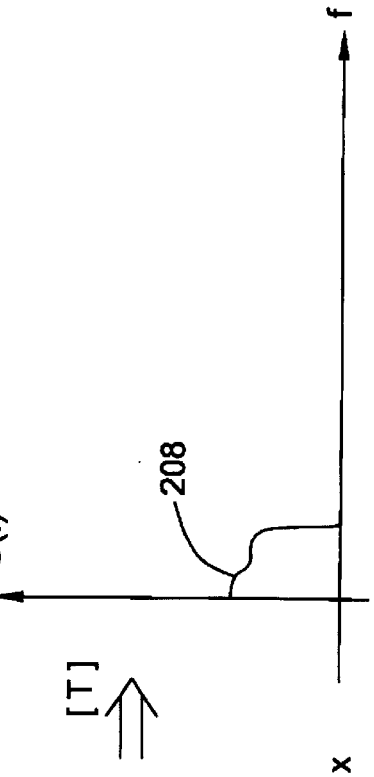
Figure 5C:
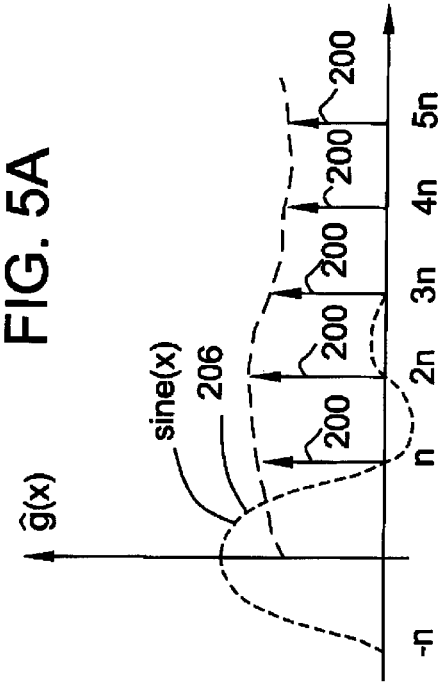
Figure 5D:
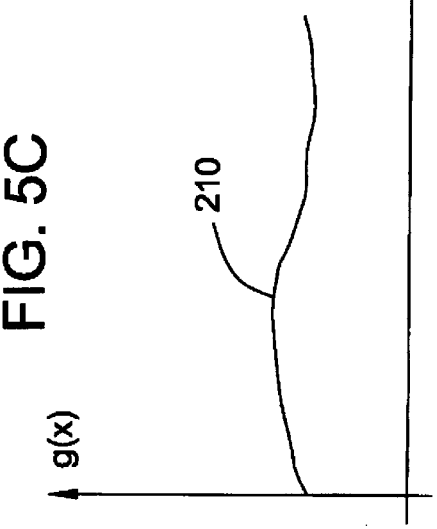

With reference now to FIG. 5*a*, a collection of discrete samples 200 at spacing n (a comb function with spacing n) are shown with respect to the spatial domain. The Fourier transform of this discrete function ĝ(x) 200 is a periodic function Ĝ(f) 202 with a period of 1/n shown in FIG. 5*b*. As recognized by those skilled in the art, the middle portion of the frequency spectrum between –½ n and +½ n contains the relevant frequency content of the image. All the other sample points outside of this frequency range are aliases, and can negatively influence the output image. A perfect reconstruction filter simply sets the amplitudes of the aliased frequencies (the sample points outside of the +–½ n range) to zero. The resultant function 208 is shown with respect to FIG. 5*d*. This process is equivalent to multiplying the function 202 with a box function 204 having a width +–½ n. In the spatial domain this converts to convolving with a sinc(x) function 206 with a width such that the first two zeroes, points of zero amplitude, are at +–n. The reconstructed function 210 is shown in FIG. 5*c*.

Figure 6:
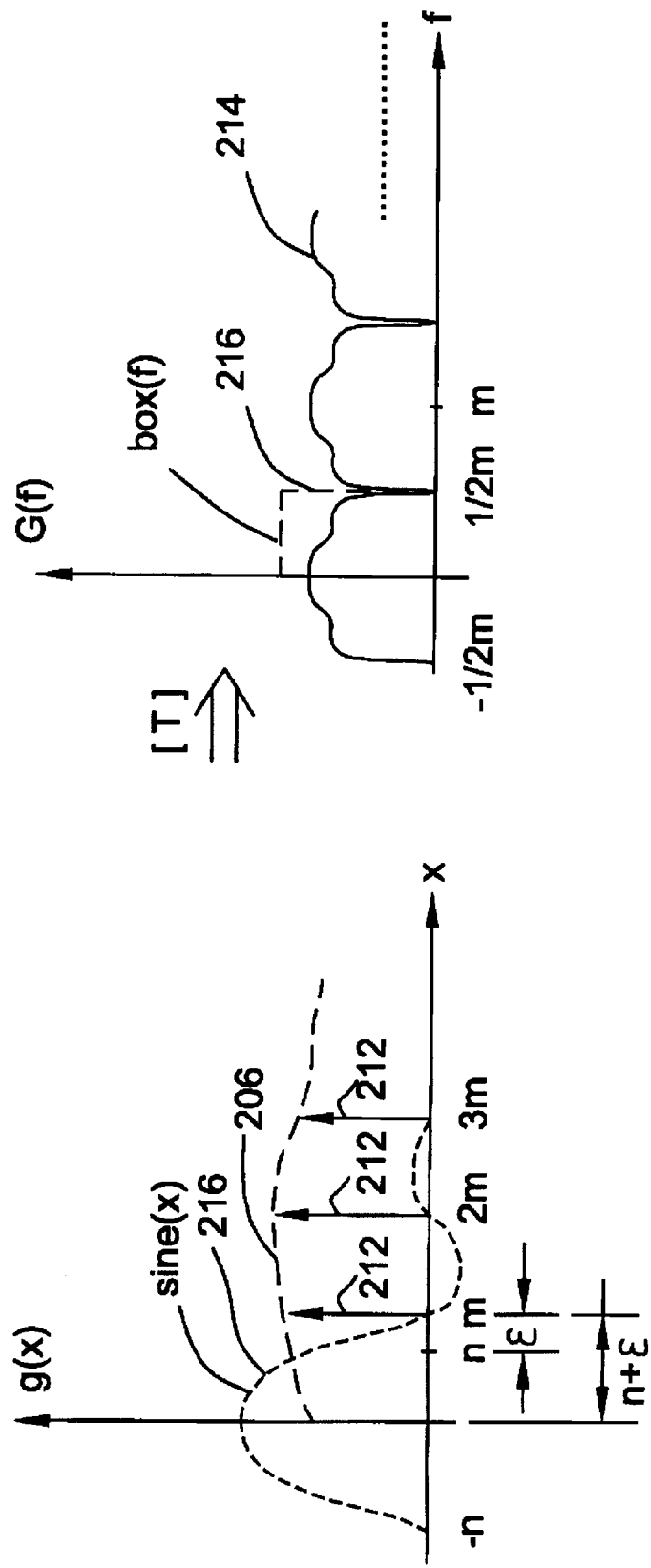
FIG. 6 is a diagram illustrating the characteristics of an ideal filter to be applied to the sampled image upon the selection of a rescale factor.

The steps described above refer to the anti-aliasing process, which is a procedure for minimizing the distortion and other unwanted visual effects that can occur when an image is rescaled. In most conventional image filtering applications, this is the initial process applied to the sampled image. The second process, in which the image is actually rescaled is referred to as downsampling, and is described with reference to FIG. 6*a*. Downsampling is the act of representing the same image information using fewer samples. A downsampled function version for the reconstructed function 208/210 is a comb function 212 at spacing m. Because the same function 206 is being represented with fewer samples 212, the spacing of each of the sample points are shifted by a value ε from its original spacing of n(m= n+ε). We multiply this discrete function g'(x) by the reconstructed function g(x) 210 getting a series of samples. In Fourier space, or the frequency domain, this corresponds to convolving the transform function 202 by a comb function with spacing 1/m, resulting in the formation of the periodic function 214.

A perfect filter for generating the downsampled function g(x) XX having new sample spacing m will shave off the spectral content so that it is zero outside –½ m to +½ m. This is equivalent to multiplying by a box(f) 216 in the frequency domain and sinc(x) 218 in the spatial domain with the first two zeroes occurring at +–m. Obviously, this process is the same antialiasing process described for the original function of spacing n, except that the widths of the applied filters 216 and 218 are equal to m. While the sinc function is highly effective for approximating the output image values, its infinitesimal characteristics make it impractical for usage in standard software applications. For this reason, the sinc(x) filter 216 for the downsampled function 206 is typically approximated with a triangle function.

Triangle Anti-Aliasing Filter

Using a triangle function of width ±m as the filter to be applied to the image for generating the downsampled function provides acceptable results. Mathematically, the process is the same as multiplying the downsampled function by the sinc squared function in the Fourier domain, where sinc squared is stretched so that the first zeroes occur at ±1/m. This is illustrated in greater detail in FIG. 7, which shows a collection of samples 240 at spacing n in the spatial domain, and the corresponding samples in the frequency domain 242.

As shown, a string of samples 240 at spacing n (a comb with spacing n) are given. Consequently, this discrete function given in the spatial domain has a Fourier transform that is a comb with spacing 1/n. In downsampling the filter so that the new sample spacing is m, we apply (convolve) the discrete function 246 with a triangle 248 of extent ±m. In the frequency domain 246, this corresponds to multiplying by sinc squared 250, where sinc squared is stretched to put the first zeroes 252/254 at ±1/m. The resultant function in the frequency domain depends on whether m is an integer multiple of n. If so, the teeth of the comb of spacing n will hit the zeroes of sinc squared at every m/n th zero. The result of the filter is constant and quality output is produced. If m/n is not an integer, however, the teeth at spacing 1/n will hit nonzero regions of sinc squared resulting in a Fourier transform that has a string of nonzero values at spacing 1/n. The spatial domain version of this is a periodic function with period n. When rescaling at spacing m, the filter response is ripple output instead of a constant output. In particular, the worst case of rippling occurs approximately at m=1.5*n. This places the first comb tooth at about the middle of the first side lobe of sinc squared.

This phenomenon is further illustrated by way of example in FIGS. 8a thru 8f. Starting with FIG. 8a, a sampled function ĝ(x) is shown as a series of discrete samples 300 at a spacing n equal to 2. A rescale value is selected such that the new pixel spacing m=3, resulting in a filter 302 of extent +−3 being applied to the function. Notice in this case, m is not an integer multiple of n. In the frequency domain shown in 8b, this corresponds to samples 304 spaced every 1/n=½ apart with the frequency function Ĝ(f) multiplied by sinc squared 306 such that the first zeros occur at +−1/m=⅓. Because m/n=1.5, a non-integer value, the teeth at spacing ½ along the frequency scale hit non-zero regions of the sinc squared function. This produces ripples within the rescaled output image instead of constant output.

Figure 8A:
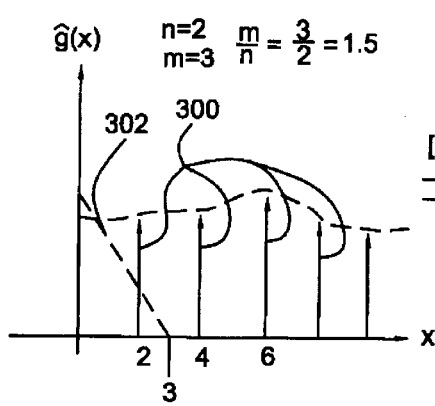
FIG. 8 is a diagram showing instances of a bilinear filter kernel being applied to a sampled image at varying kernel widths.
Figure 8B:
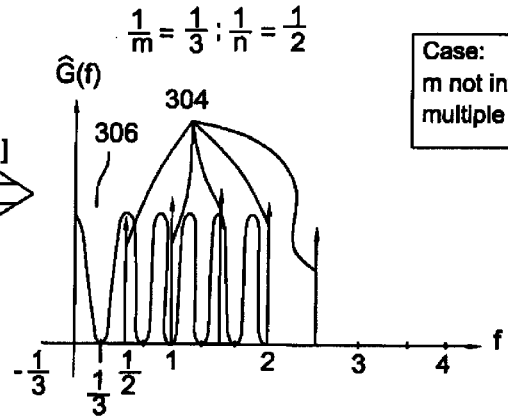
Figure 8C:
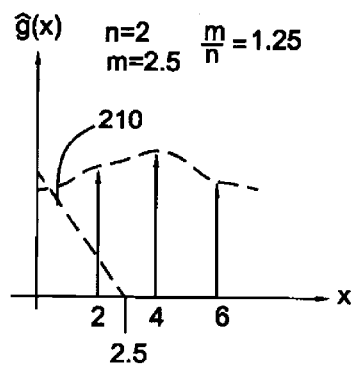
Figure 8D:
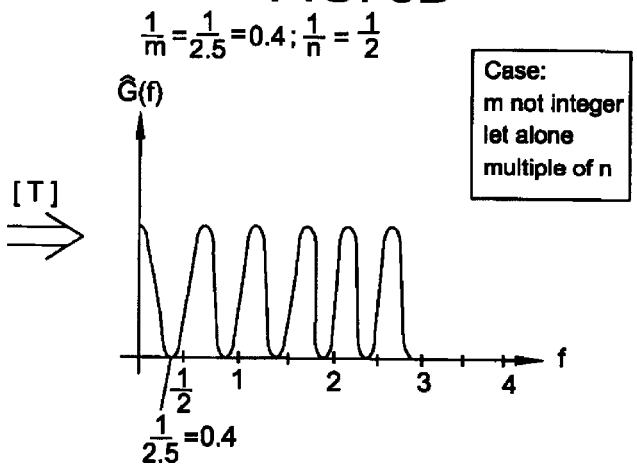
Figure 8E:
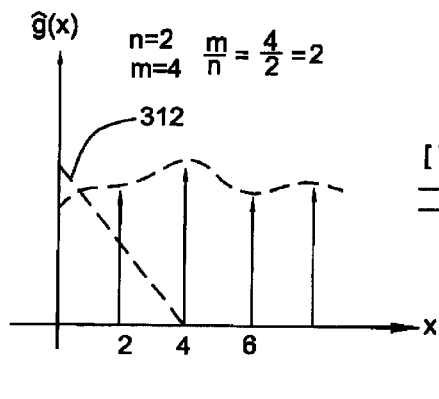
Figure 8F:
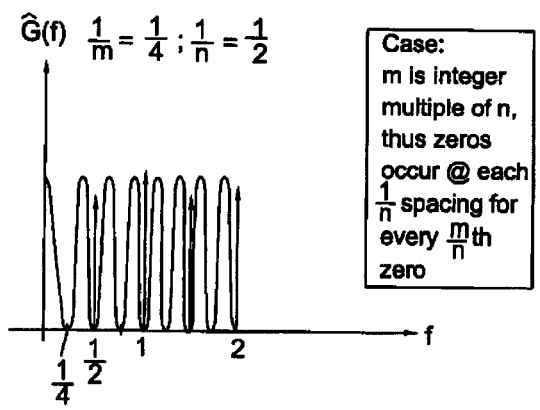

Referring now to FIGS. 8c and 8d, another scenario in which ripples are produced is shown. In this example, the new sample spacing m=2.5, which corresponds to a non-integer kernel 310 width of +−2.5. Resultantly, the zeros of the sinc squared function along the frequency scale (FIG. 8d) produce its first zeros at 1/2.5=0.4. Again, because m/n=1.25 which is a non-integer value, the teeth at spacing ½ along the frequency scale hit non-zero regions of the sinc squared function, and non-constant filter response is attained. This is unlike the properties of the filter kernel 312 illustrated in FIGS. 8e and 8f, where the extent of the filter kernel is such that m is an integer multiple of n. In this case, m=4, which produces zeros of the sinc squared function in the Fourier domain at every m/n th zero. In other words, the zeros occur at frequencies of 1/n, 2/n, etc., which is appropriate for ensuring constant output.

The ripple effect that occurs in the output is not because of round off error, but is an intrinsic property resulting from the use of a triangle as a filter (bilinear filter kernel) for the image being rescaled. Indeed, ripples also occur due to the application of other filter types as well, including bicubic and quadratic. While it is possible to produce a ripple free output image by applying the ideal sinc filter, usage of such a filter is impractical due to its infinitely wide extent. Hence the usage of other filter types (e.g., the bilinear filter) is suitable for performing image processing. Yet, the consequence of using such filters is that they can produce ripples anytime the constant (unity) response of the triangle is altered with varying scale factors, as illustrated in FIGS. 8a–8d by the usage of a triangular filter. To over come this characteristic of the filter, the finite width of the filter must be modified such that no ripples are produced in the output image while still being practical to implement. This equates to a filter kernel of extent ±m (spatially) that has zeroes at the frequencies 1/n, 2/n etc, similar to the filter kernel 312 in FIGS. 8e–8f. In the following paragraphs, the invention is described with respect to the various techniques for ensuring the ripple free output.

Partial Integral Analysis Implementation

Figure 7:
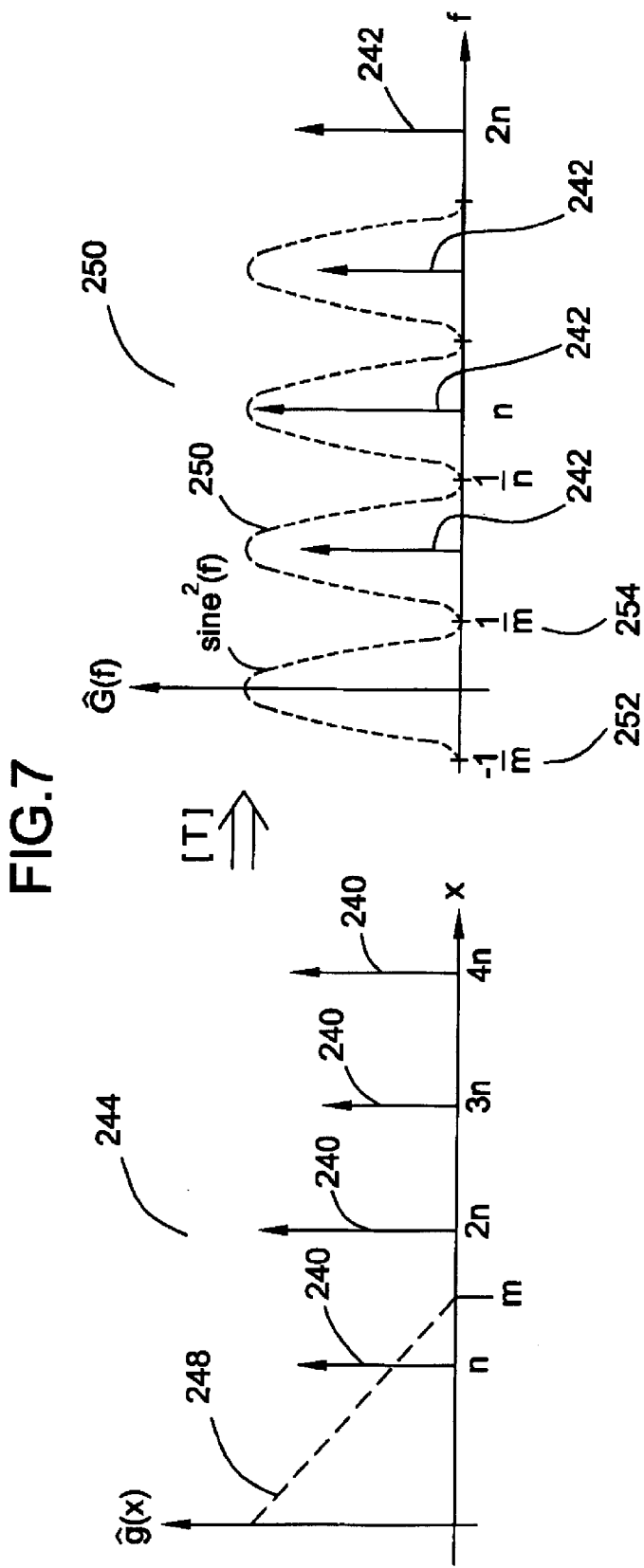
FIG. 7 is a diagram illustrating a bilinear filter kernel being applied to a sampled image.
Figure 9A:
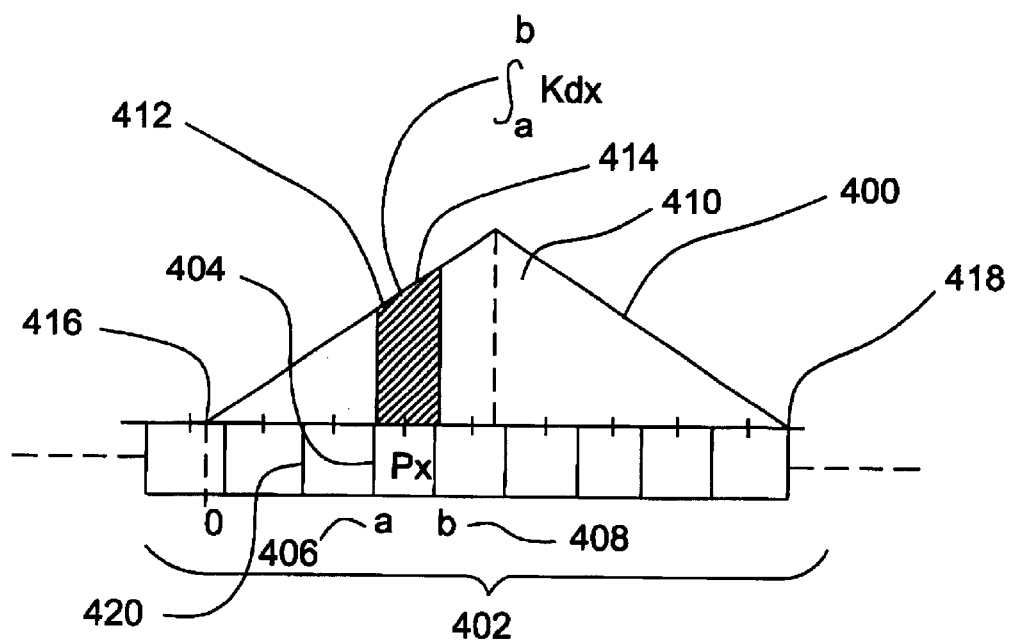
FIG. 9 is a diagram illustrating a look up table for calculating the area over a region within the extent of a filter kernel.

Referring now to FIG. 9, a bilinear filter kernel 400 is applied to a stream of pixels 402 of an input image. A single pixel 404, having an intensity value equal to $P_x$, has a left edge 406 and right edge 408 labeled "a" and "b" respectively. The separation between each edge (a minus b) is equal to the spacing between each of the pixels 402. This represents the original sample spacing n, as shown in FIG. 7. In normal applications, the contribution of each pixel in generating the output pixel to be located at position 410 is computed by multiplying the pixel value $P_x$ by the height of the kernel 412 at that position of the pixel (point sampling). In accordance with the invention however, finite element analysis is applied to compute the contribution of each pixel under the kernel.

Specifically, the area 414 between the left edge a 406, and right edge b 408 of the pixel 404 represents the kernel weight in the region of that particular pixel. As shown in 9a, this area 414 is given by the mathematical relation:

$$\int_a^b K(x - x_c) dx$$

where K represents the filter kernel function with respect to x, and $x_c$ represents the current position of pixel 404 spatially (e.g., the position at which the kernel is filtered). To calculate the contribution from this individual pixel, the weight (area) 414 is simply multiplied by the pixel intensity value $P_x$ to yield the filter response value. This same process is then repeated for each of the pixels 402 that lie underneath the kernel 400. The total response, or value of the output pixel, is the sum of all of the pixel contributions.

Partial integral analysis, as described above, for computing the output pixel value offers various advantages. One advantage is that the time required for processing can be sped up by implementing the algorithm as a lookup table (LUT) of the running total of the area of the filter kernel 400 from left 416 to right 418. This minimizes the amount of computer resources and time often required for processing, and particularly eliminates the need for performing individual calculations of the area as the filter kernel 400 is shifted from pixel to pixel. Also, a LUT containing the summed area of the kernel is distinct from conventional LUTs used in image processing applications, where only actual kernel values at various points are indicated. This distinct in table implementation makes a significant difference in the amount of memory required for storing the table, as conventional LUTs indicating single points can consume large quantities of memory.

Figure 9B:
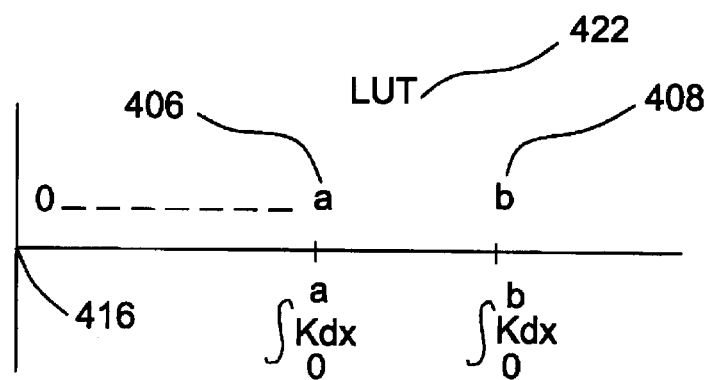

In FIG. 9b, an example of a LUT 422 as described in the context of the invention is shown. To evaluate a pixel's contribution using the LUT 422, the area of the kernel up till the pixel's right edge 408 is looked up in the table. This area is then subtracted from the area computed from the leftmost point of the kernel 416 to the pixel's left edge 406. The result of this simple subtraction is the area between the two edges and hence the contribution for the pixel being considered. In computing the output value $R(x_c)$ resulting from the contribution of each of the pixels 402, where $x_c$ is the position 410 of the output pixel value, the computation is given as:

$$R(x_c) = \sum_{i=-\infty}^{\infty} C(i)\left[IK\left(\frac{i-x_c+\frac{1}{2}}{w}\right) - IK\left(\frac{i-x_c-\frac{1}{2}}{w}\right)\right],$$

where IK is a partial sum of the filter kernel K, and w represents the width of the filter kernel as a result of a selected rescale value. IK can be easily pre-computed and stored in the LUT 422. The computation of the output pixel value R at position $x_c$ then becomes a summation of the difference of two lookup values multiplied by the pixel color C. This may be further optimized with standard techniques, such as quick access LUT mapping.

Those skilled in the art will appreciate that in this formulation the filter kernel being applied to the image data 402 need not be physically manipulated/adjusted to account for various rescale values, as in typical applications. Moreover, this technique of calculating pixel contributions based on the area can apply to any filter kernel type. For example, in a bilinear kernel, the width of the kernel is maintained at 2 (extent of −1 to 1), while a bicubic extends from −2 to 2. Instead of adjusting these settings, w is factored into the computation to represent the width the filter kernel would be adjusted to if it were actually rescaled. Because w is included by way of division into the function of $x_c$, this has the effect of including more pixels under the filter kernel; the same result that would occur if the kernel were actually stretched by w. This is significant in that it allows the filter kernel to maintain unity area at all times, while still accounting for varying rescale values. Moreover, this approach to handling varying rescale values minimizes the need to constantly recompute the LUT for the filter. The likelihood of ripples is eliminated because a constant filter response is maintained.

Optimal Filter Implementation

In another aspect of the invention, an optimal filter kernel is provided for processing the output image. The optimal filter kernel, as defined herein, relates to a filter kernel having ideal characteristics for providing ripple free output. In particular, the optimal filter kernel is computed by convolving a box filter with another filter, such as bilinear or bicubic, such that a filter having ideal anti-aliasing characteristics is produced. Applying the optimal filter kernel allows for the reuse of existing code, as the computational procedure for performing the image processing technique is identical to that of conventional techniques. The only difference in procedure is that the optimal kernel is applied, or mapped to the image during the rescaling process instead of a typical bilinear or bicubic kernel. Details of the usage and implementation of the optimal filter kernel are described in the following paragraphs In an effort to better describe the optimal filter implementation, the logic behind its construction must be presented. Particularly, each input pixel that comprises a sampled image is considered to be an area of coverage instead of as an individual (discrete) intensity sample. With this perspective in mind, the filter response is then the integral of the filter kernel function (K) multiplied by the pixel color function (P) along the x-axis. This is based on the idea that point sampling in the filter kernel is a discrete evaluation of the integral based on the original (continuous) data used to produce the pixel stream (this was described earlier with respect to the partial integral implementation). The way to derive this input function—the function representative of the image—is to consider the input sample points to be a comb function C (responses equal to the pixel value spaced at integer locations and zero everywhere else). Mathematically, this is given by the function $$C(x) = \begin{cases} S_x, & \lfloor x \rfloor = x \\ 0, & \text{otherwise} \end{cases},$$

where $S_x$ is the pixel value at position x (integer). S represents the input 'sample' function.

Convolving this comb function C(x) with a (unit) box filter, we get:

$$P(x) = \int \text{box}(a) \cdot C(x-a) da$$

This function P is the pixel color function described above. The pixel color function is a mathematical relation that describes the change in intensity/color of the input image over the range of pixels (x) that comprise the image. From this relation for P, the resultant value of the output pixel R(xc) is given as $$R(x_c) = \int_{-\infty}^{\infty} K(x-x_c) P\left(\frac{1}{w}x\right) dx,$$

which is the resultant filter response.

In this formulation, the function K represents the filter kernel. It is centered initially at x=0 and therefore needs to be repositioned to the point of interest $x_c$, which is the location of the output pixel value to be generated as a result of a selected rescale value. Also, K is zero for all values outside of the kernel width. As in the implementation discussed previously, the filter kernel K is not physically rescaled. If a bilinear filter is applied, it extends along the x-axis from −1 to 1. For a bicubic filter kernel, the extent is −2 to 2. The factor w is used to represent the scale factor and is the rescaled width of the kernel that would be used if the kernel were rescaled to accommodate varying shrink factors. By accounting for the rescaling in this way, unity area is constantly maintained, and the response of the filter kernel is maintained such that $$\int_{-\infty}^{\infty} K(x-x_c) dx = 1.$$

Resultantly, no physical modifications, such as adjustment of the filter width, need be applied.

Given the properties expressed above, the output image function R can be represented as follows:

$$R = (C \hat{x} \text{box}_n) \hat{x} K_w$$

In this formulation, R is simply a slightly reordered convolution operation. The convolution of the input function C with a unit box ($C \hat{x} \text{box}_n$) is essentially the pixel color function P described earlier. Using the associativity of the convolution operation, R can be further reordered as follows:

$$R = C \hat{x} (\text{box}_n \hat{x} K_w)$$

Figure 10:
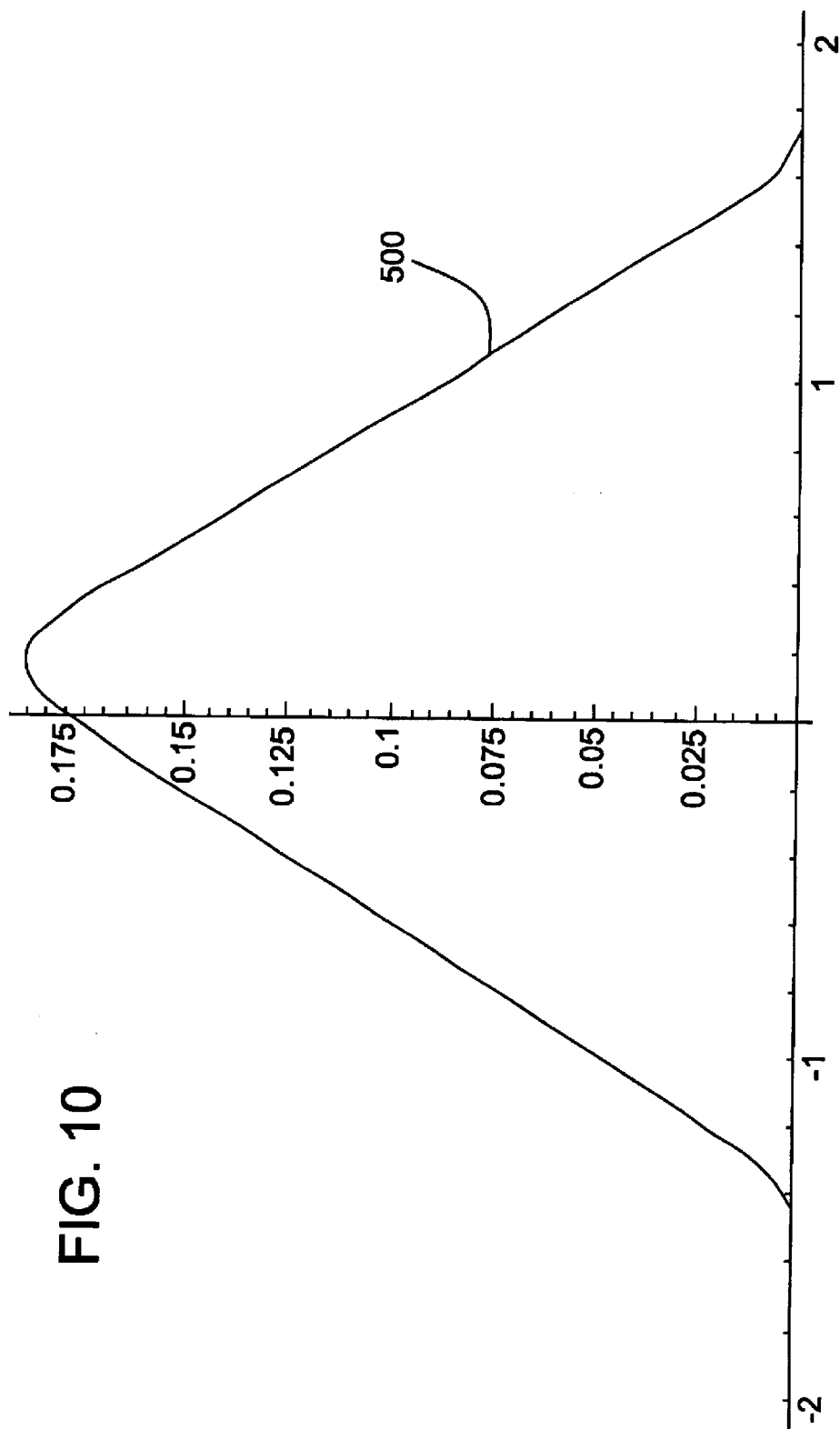
FIG. 10 is a diagram illustrating an optimal filter kernel to be applied to the sampled image for performing image resealing.

This formulation in terms of convolution provides an interesting implementation of the output pixel function, which is applicable to existing table driven code. A table can be constructed for the convolution operation between the kernel function K and the unit box ($\text{box}_n \hat{x} K_w$). This table, representing a table of filter characteristics (the optimal filter), can then be substituted into the existing table driven filtering algorithm. A significant level of optimization is thus achieved in computing R this way because the same procedural steps involved in typical rescaling operations (refer to FIG. 3) can be utilized. The only change is that the optimal filter kernel is applied to the source image, such as the table computed via the convolution process. An example of an optimal filter, constructed from the convolution of a box with the bilinear (tent) filter kernel is shown in FIG. 10. As is clearly illustrated, the "optimal" filter kernel 500 is a distinct filter implementation than that of the "ideal" sinc filter 144 of FIG. 4c. Also, the optimal filter kernel is distinct from typical filter kernels (e.g., bilinear or bicubic) in that it is computed via convolution, and so is designed specifically to accommodate a given rescale factor. In this respect, the optimal filter kernel 500 of the Figure has the characteristics required for generating ripple free output, but does not require infinite calculations like the sinc filter. Particularly, the optimal filter kernel 500 has unity area so that the filter kernel response remains constant $$\left( \int_{-\infty}^{\infty} K(x - x_c) dx = 1 \right)$$

as it is applied to the image. Also, convolving the input pixels with a box function ($C \hat{x} box_n$) is the same as multiplying the Fourier transform representation of the function by sinc(1/n). This is most desirable because this function produces zeroes in the frequency domain at the correct frequencies to be aliased (e.g. 1/n, 2/n etc). Resultantly, constant output is produced as opposed to ripples.

In FIG. 11, the steps involved in producing the output function R according to the various techniques described herein are illustrated. In FIG. 11a, the conventional techniques for performing image rescaling and reconstruction are shown. This is the same procedure outlined graphically in FIG. 3. In 11b, the partial integral approach is illustrated. Notice that the steps illustrated in FIG. 11a are the same for the implementation of 11b, with the exception of steps 700 and 702. These steps refer to the multiplication of partial integrals in the region of the source pixel (as selected from a LUT) with the actual pixel value for computing the resulting output pixel. Similarly, in FIG. 11c, the same procedural steps shown in 11a are followed, with the exception of step 800, which indicates the usage of the optimal filter kernel for applying to the source image (step 606). Again, the optimal filter kernel is computed with respect to the given rescale value such that it is appropriately sized with respect to the given image.

Overall, the invention provides a simple mechanism for ensuring that sampled images can be rescaled without considerable degradation of visual quality. Particularly, the ripple effect that occurs in some applications that support image reconstruction and rescaling is addressed by the method and system of the invention. While all of the implementations illustrated in FIG. 11 generate a rescaled output image, only FIGS. 11b and 11c illustrate suitable techniques for ensuring that the output image is generated free of ripples. With respect to the partial integral implementation (FIG. 11b), fast computation of the output is achieved by simply referring to a LUT for the pre-computed area of the filter between specific points. This significantly speeds up the interpolation process (steps 702 and 610). Also, because the right edge of a previous pixel n=the left edge of the current pixel n+1, the area computation can be performed by recalling the last value looked up in the table prior to shifting to the next pixel.

In accordance with the optimal filter implementation, ripple free output is ensured because the filter is constructed by convolving a box filter with an extent that accommodates a given rescale factor with a filter of fixed width and unity area. As such, the optimal filter kernel provides anti-aliasing characteristics while producing zeros at the appropriate frequency values (1/n, 2/n, etc.) in the frequency domain to prevent ripples. Also, the optimal filter kernel 500 can be applied to the existing table driven code to enhance the standard technique outlined in FIG. 11a. This characteristic of the optimal filter promotes code reuse, as none of the image processing algorithms for performing steps 600 thru 616 need be modified.

It is important to note that various means exist for applying the methods of the invention. For instance, the invention can be implemented as an executable script, program module, API routine or any other executable function or code capable of being performed by a computing device. As such, these executables can contain computer executable instructions for carrying out the steps of FIGS. 11b and 11c. These instructions may be in the form of algorithms that are retrievable by an application residing on the computer, language specific code such as C or C++, or even machine logic. Also, the LUTs containing the respective kernel values to be used for implementing the methods of the invention can be retrieved according to standard memory allocation and access techniques, including database referencing, file pointing and memory mapping. Any means by which the invention can be utilized in conjunction with software, hardware or firmware based applications that require the ability to manipulate graphic images is suitable for usage with the invention.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method for generating a ripple free output image comprised of one or more output image pixels, the output image being generated as a result of processing one or more source image pixels that comprise a source image sampled at a first rate, the output image being representative of the source image as sampled at a second rate, the method comprising:

applying an optimal filter kernel to the one or more source image pixels, the optimal filter kernel being established by convolving a box filter with a filter of fixed integer width and unity area;

computing the value of an output image pixel based on the optimal filter kernel and the one or more source image pixels;

placing the computed output image pixel value into a memory location allocated for the one or more output image pixels; and repeating the steps of applying, computing and placing for each of the one or more source image pixels.

2. The method of claim 1 wherein the step of applying includes establishing the optimal filter kernel as a look up table, the optimal filter kernel having fixed integer width and zero amplitude at locations along a frequency scale corresponding to the reciprocal of the spacing of the one or more pixels of the source image.

3. The method of claim 2 wherein the look up table contains values representative of the amplitude of the optimal filter kernel between any set of points within the fixed integer width of the optimal filter kernel.

4. The method of claim 1 wherein the step of applying includes determining a transform function used to create the source image, the source image being a digital representation of a source object comprised of one or more source image pixels.

5. The method of claim 1 wherein the step of applying further includes determining the output image pixel position with respect to a selected rescale value, the rescale value corresponding to a modified number of pixels to be used for providing a digital representation of the source object, the position of the output pixel corresponding to an offset position within the source image.

6. The method of claim 1 wherein the step of applying further includes mapping the optimal filter kernel to an offset position within the source image corresponding to a position of the output image pixel, the optimal filter kernel being mapped to the source image by applying the inverse of the transform function.

7. The method of claim 1 wherein the step of computing includes interpolating one or more source image pixels within a range of pixels within the fixed integer width of the optimal filter kernel, the number of pixels within the range of the optimal filter kernel being determined by multiplying the number of pixels that comprise the width of the source image by a selected rescale value.

8. The method of claim 7 wherein the rescale value is selected by a user of a computer in which the source image is accessible from.

9. The method of claim 7 wherein the rescale value is selected by a computer application executing upon a computer in which the source image is accessible from.

10. A computer-readable medium having computer-executable instructions for performing the steps recited in claim 1.

11. A computer-readable medium having computer-executable modules comprising:
means for applying an optimal filter kernel to one or more pixels that comprise a source image, the optimal filter kernel being established by convolving a box filter with a filter of fixed integer width and unity area;
means for computing the value of an output image pixel based on the optimal filter kernel and the one or more source image pixels; and
means for placing the computed output image pixel value into a memory location allocated for one or more output image pixels.

12. The computer-readable medium of claim 11 further comprising a lookup table containing values representative of the amplitude of the optimal filter kernel between a set of points within the fixed integer width of the optimal filter kernel, the table being accessible by said means for applying the optimal filter kernel.

13. The computer-readable medium of claim 12 wherein the optimal filter kernel has fixed integer width and zero amplitude at locations along a frequency scale corresponding to the reciprocal of the spacing of the one or more pixels of the source image.

14. A method for resizing a source image comprised of one of more source image pixels such that the resultant output image is free of ripples, the output image comprising one or more output image pixels, the method comprising:
applying a filter kernel of unity area and fixed integer width to the one or more source image pixels;
computing the value of an output image pixel based on the area of the filter kernel between a set of points within the fixed integer width of the filter kernel, the output image pixel corresponding to the one or more pixels that comprise the output image;
placing the computed output image pixel value into a memory location allocated for the one or more output image pixels; and
repeating the steps of applying, computing and placing for each of the one or more source image pixels.

15. The method of claim 14 wherein the step of applying includes centering the filter kernel at a position within the source image corresponding to a position of the output pixel to be generated.

16. The method of claim 15 wherein the filter kernel is centered such that one or more source image pixels are positioned within the width of the filter kernel.

17. The method of claim 14 wherein the step of computing includes accessing a look up table containing values representative of the area of the filter kernel between a set of points within the fixed integer width of the filter kernel.

18. The method of claim 14 wherein the step of computing includes determining the area of the filter kernel between a left edge and a right edge of each of the pixels positioned within the fixed integer width of the filter kernel.

19. The method of claim 18 wherein the left edge and right edge includes endpoints of the filter kernel, the endpoints corresponding to a location in which the filter kernel has zero amplitude.

20. The method of claim 18 wherein the step of determining includes subtracting the area of the filter kernel as determined from the filter kernel endpoint to the right edge of a pixel from the area of the filter kernel as determined from the filter kernel endpoint to the left edge of a pixel, the area determined up to the left edge having been computed as the right edge of a preceding pixel.

21. The method of claim 14 wherein the step of computing includes multiplying the area of the filter kernel between the left edge and right edge of each of the pixels positioned within the width of the filter kernel by the value of each corresponding pixel to yield one or more products, the resulting products being summed to yield the output image pixel value.

22. The method of claim 14 wherein the number of pixels positioned within the width of the filter kernel is determined by multiplying the number of pixels that comprise the width of the source image by a selected rescale value.

23. The method of claim 22 wherein the rescale value is selected by a user of a computer upon which the source image is accessible.

24. The method of claim 22 wherein the rescale value is selected by a computer application executing upon a computer in which the source image is accessible from.

25. A computer-readable medium having computer-executable modules comprising:
means for applying a filter kernel of unity area and fixed integer width to one or more source image pixels;
means for computing the value of an output image pixel based on the area of the filter kernel between a set of points within the fixed integer width of the filter kernel, the output image pixel corresponding to one or more pixels that comprise an output image; and
means for placing the computed output pixel value into a memory location allocated for the one or more pixels that comprise the output image.

26. The computer-readable medium of claim 25 further comprising a lookup table containing values representative of the amplitude of the filter kernel between a set of points within the fixed integer width of the filter kernel, the table being accessible by said means for applying the filter kernel.

27. The computer-readable medium of claim 26 wherein the filter kernel has zero amplitude at locations along a frequency scale corresponding to the reciprocal of the spacing of the one or more pixels of the source image.

28. The computer-readable medium of claim 23 wherein the memory location is accessed by a graphics display device for rendering the output image to a user interface screen.

* * * * *